United States Patent Office 3,222,596
Patented Dec. 7, 1965

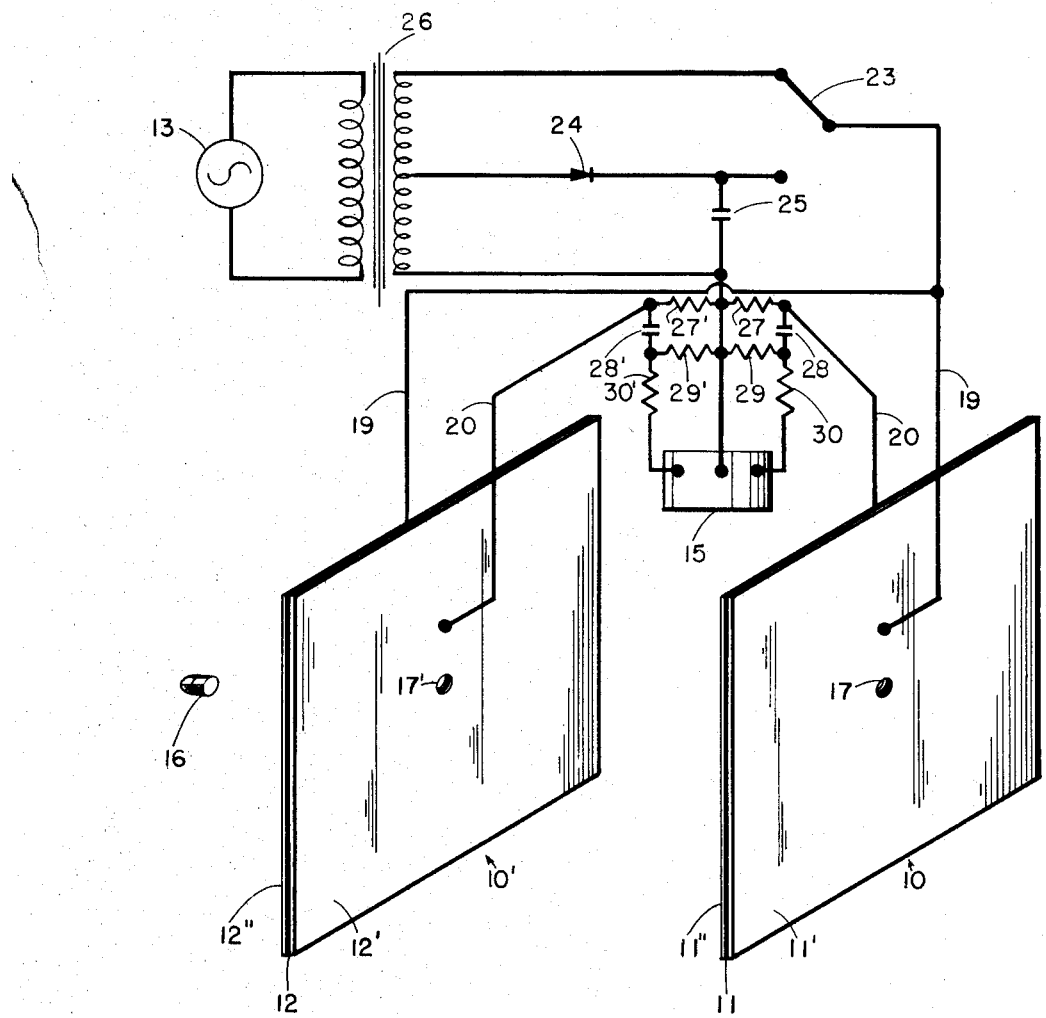

3,222,596
DEVICE FOR MEASURING THE VELOCITY OF A PROJECTILE USING SPACED PENETRABLE ACTUATORS IN SHEET FORM
Earl A. Meyer, Madison, Wis., and James B. Spencer, Corvallis, Oreg., assignors, by mesne assignments, to the United States of America as represented by the Secretary of the Army
Continuation of abandoned application Ser. No. 157,535, Dec. 6, 1961. This application Mar. 31, 1965, Ser. No. 447,599
5 Claims. (Cl. 324—70)

This application is a continuation of our copending application Ser. No. 157,535, filed Dec. 6, 1961 (now abandoned).

This invention relates to a method and means for measuring the velocity of ballistic projectiles, and more particularly relates to a means and method wherein two plastic sheets which are coated on both sides with films of conductive metal are spaced a known distance apart and are operably connected in parallel to a voltage source so that conductive films on opposite faces of each sheet are charged to opposite polarity. A timing device such as a chronograph is connected into the circuit so that the elapsed time between instantaneous short circuits produced by a ballistic projectile piercing the sheets is measured and recorded. The elapsed time record enables the velocity of the ballistic projectile to be accurately calculated when the distance between the sheets is known.

Heretofore electric eye timing devices have been used to actuate a chronograph to measure the time of passing of a ballistic projectile over a measured distance. Such means are expensive and are not suited to being quickly rigged for use. The device of this invention provides an inexpensive ballistic velocity measuring device which can be quickly assembled and temporarily installed. The number of ballistic velocity measurements which may be made without replacement of the expendable coated plastic sheet may be as many as are necessary to disintegrate the plastic material. Thus, several dozen measurements can be made without replacement of the sheets.

It is an object of this invention to provide re-usable means for closing an electrical contact which actuates a timing device.

It is another object of this invention to provide an inexpensive and accurate means and method for actuating an elapsed time measuring device.

It is another object of this invention to provide a device for measuring velocities of ballistic projectiles.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

The figure is a schematic perspective view of the device of this invention.

In the herein disclosed invention two sheets are provided of insulating material such as a paper or plastic, i.e., polyethylene terephthalate composition sold commercially as "Mylar," polyethylene or vinyl plastics, or other synthetic resinous materials such as can be coated on each face with a film of conductive metal, such as aluminum, or with a non-metallic conductive material such as carbon, conductive paint or the like, to provide two non-contacting conductive coatings on either face of the two sheets of insulating material. The two coatings on each sheet can be charged to different polarities to provide, in effect, a capacitor which can be short circuited by piercing the coated sheets with a projectile so that the coating on one side of one sheet is smeared into contact with the coating on the other side of the same sheet by the passage of the projectile. The instantaneous short-circuit between the two films on either side of the sheet produces a pulse which actuates a timer thereby recording the passage of the projectile through the sheet. To clear the short circuit, relatively high voltages can be applied to the sheet which causes the short circuit to burn out quickly to again provide two conductive layers effectively insulated from each other. A second sheet of similar construction may be placed at a known distance from the first such sheet and be wired in parallel therewith so that another pulse is produced at the timer by the projectile passing through the second sheet. When the two pulses are recorded on a timing graph, the average velocity of the projectile can be calculated if the spacing between the sheets is known.

Screens 10 and 10' are arranged parallel to each other and substantially normal to the flight path of projectile 16, and comprise sheets 11 and 12 of an electrically non-conductive composition such as polyethylene of 2 mil thickness. Layers 11' and 11", and 12' and 12" on sheets 11 and 12 respectively comprise continuous films of aluminum such as vacuum deposited films of from a few microns to ½ mil thickness. Electrical conductors 19 and 20 are connected in parallel to opposite faces of each of the two screens and are connected through center top transformer 26 to alternating current generating means 13, as shown. The alternating current supplied by generator 13 through transformer 26 is rectified to direct current by rectifier 24 charging capacitor 25. This D.C. potential is applied across the sheets and resistors 27 and 27' when switch 23 is thrown in the downward closed position (not illustrated). Connection is properly made to chronograph 15 or to other operably timing means so that the pulses developed across resistors 27 and 27' resulting from a projectile piercing a screen are of proper polarity to trigger the chronograph. The A.C. component of these signals pass through coupling circuits 28 and 29, and 28' and 29', to the chronograph, with grid current of the latter limited by resistors 30 and 30'.

When switch 23 is thrown in the upward closed position (as illustrated in the figure), a secondary alternating current circuit is provided in which the A.C. voltage in the circuit is preferably greater than line voltage as is the case when the voltage is stepped by means of transformer 26 from 110 volt 60 cycle line voltage to a higher voltage of preferably about 400 volts.

The A.C. circuit is provided to clear any short circuits which remain in screens 10, 10' after passage of projectile 16 through the screens. The relatively high A.C. voltage impressed across the screens causes near shorts in the screens to spark clear while amperage at that voltage of about 6 amps. will be sufficient to melt and clear the screen of smeared metal film. The voltage and amperage of the A.C. circuit can be best established empirically because the thickness and the type of the metallic deposit and the velocity and shape of the projectile are all variable, which affect the establishment of short circuit in the screens. Chronometer 15 is protected from damage by the alternating current because resistors 30, 30' and capacitors 28, 28' provide relative high impedance at 60 cycle frequency in comparison to resistors 29, 29'.

As shown, bullet 16 has pierced both sheets, 11 and 12, in that sequence, and chronometer 15 has recorded the elapsed time of passage by means of current pulses in the chronometer produced by puncture 17 in sheet 11 and puncture 17' in sheet 12. The two current pulses result from electrical contact being made through each of sheets 11 and 12 by bullet 16 being simultaneously in contact with the conductive films 11' and 11" in screen 10, and with films 12' and 12" in screen 10'. If a metallic film on one side of a sheet is smeared by passage of bullet 16 through a puncture into contact with the film on the opposite face of the sheet a short circuit exists in the sheet. When the sheet is charged to higher voltages the smeared metal quickly burns through, thereby again opening the circuit between the two faces of the sheet. It is preferred that a voltage of approximately 400 volts A.C. may be employed for clearing short circuits between the two faces of sheets 10 and 10'; however, lower voltages which are less hazardous and may be used in some cases. With square nose bullets or shrapnel fragments or the like the lower voltages may be operable, however, with round nose bullets higher voltages are usually required to be used to clear the screens.

While certain modifications and embodiments of the invention have been described, it is of course be understood that there are a great number of variations which will suggest themselves to anyone familiar with the subject matter thereof, and it is to be distinctly understood that this invention should not be limited except by such limitations as are clearly imposed in the appended claims.

We claim:

1. A re-usable device for measuring the velocity of ballistic projectiles comprising in combination a first thin sheet and spaced therefrom a second thin sheet of penetrable electrically nonconductive material, said sheets being arranged parallel to each other and substantially normal to the flight path of a projectile and having provided on each face thereof substantially continuous electrically conductive meltable films, said films being spaced from each other and mutually insulated by means of said nonconductive sheets; means for applying a direct current to said films from a voltage source, said films on either side of each of said sheets being charged to opposite polarity by said direct current; electrical timing means operably connected to the electrical circuit comprising said films and said voltage source; said films on each sheet being smeared into short-circuiting contact with each other by a projectile penetrating said thin sheets, whereby said timing means are actuated to indicate the time elapsed between the occurrence of the short circuit in said first sheet and the occurrence of the short circuit in said second sheet; and means for selectively applying an alternating current from the same voltage source to said sheets for melting the short-circuiting smeared contacts between said conductive films, whereby said short circuits are eliminated and said device is restored for re-use.

2. The device of claim 1 wherein said sheets are paper.

3. The device of claim 1 wherein said sheets are synthetic resinous film and said conductive layers are of metal.

4. The device of claim 1 wherein said sheets are of polyethylene terephthalate and wherein said conductive layers are aluminum.

5. A re-usable device for measuring the velocity of ballistic projectiles comprising in combination a first thin sheet and spaced therefrom a second thin sheet of penetrable electrically nonconductive material, said sheets being arranged substantially parallel to each other and normal to the flight path of a projectile and having provided on each face thereof substantially continuous electrically conductive meltable films, said films being spaced from each other and mutually insulated by means of said nonconductive sheets; rectifier means for applying a direct current to said films from an A.C. voltage source, said films on either side of each of said sheets being charged to opposite polarity by said direct current; electrical timing means operably connected to the electrical circuit comprising said films and said voltage source; said films on each sheet being smeared into short-circuiting contact with each other by a projectile penetrating said thin sheets, whereby said timing means are actuated to indicate the time elapsed between the occurrence of the short circuit in said first sheet and the occurrence of the short circuit in said second sheet; and means for selectively bypassing said rectifier means and applying an alternating current from said voltage source to said sheets for melting the short-circuiting smeared contacts between said conductive films, whereby said short circuits are eliminated and said device is restored for re-use.

References Cited by the Examiner

UNITED STATES PATENTS

| | | | |
|---|---|---|---|
| 2,016,455 | 10/1935 | Purdy | 324—60 |
| 2,622,678 | 12/1952 | Peterson | 324—70 |
| 2,819,085 | 1/1958 | Brown | 273—102.2 |

WALTER L. CARLSON, *Primary Examiner*.